United States Patent [19]
Comstedt

[11] 3,929,039
[45] Dec. 30, 1975

[54] SINGLE LEVER CONTROL DEVICE

[75] Inventor: Tore Erik Karl Comstedt, Stockholm, Sweden

[73] Assignee: Teknoflex Control System AB, Vastra Frolunda, Sweden

[22] Filed: May 7, 1974

[21] Appl. No.: 467,812

[30] Foreign Application Priority Data
May 17, 1973 Sweden.............................. 7306990

[52] U.S. Cl. ................................................. 74/878
[51] Int. Cl............................................. B60k 41/18
[58] Field of Search .............. 74/878, 876; 192/.096

[56] References Cited
UNITED STATES PATENTS

| | | | |
|---|---|---|---|
| 2,987,152 | 6/1961 | Morse............................... | 74/876 X |
| 3,115,050 | 12/1963 | Marr................................. | 74/876 |
| 3,127,785 | 4/1964 | Morse et al........................ | 74/876 |
| 3,204,732 | 9/1965 | Morse............................... | 74/876 X |
| 3,511,117 | 5/1970 | Morse............................... | 74/878 X |
| 3,741,044 | 6/1973 | Baba................................. | 74/876 |
| 3,741,045 | 6/1973 | Kobayashi......................... | 74/876 |

Primary Examiner—Samuel Scott
Assistant Examiner—Lance W. Chandler
Attorney, Agent, or Firm—Young & Thompson

[57] ABSTRACT

Control device for carrying out two different operations by means of a single operating lever, preferably for control of the throttle and gearing in boat motors. The operating lever is connected to a main shaft rotatably journalled in a housing, said shaft being directly connected to a control arm for the throttle operation and via a transmission means to a control arm for the shifting operation. The transmission means are coupled to the main shaft via a coupling which, in the neutral position of the main shaft, is disengageable upon manual axial displacement of a spring loaded coupling shaft disposed in an axial bore in the main shaft in connection with rotation of the main shaft away from the neutral position, at least one stop surface being provided which restricts the rotation of the main shaft back to the neutral position until the coupling shaft is again manually displaced, thereby preventing unintentional engagement of the coupling.

4 Claims, 3 Drawing Figures

U.S. Patent   Dec. 30, 1975   3,929,039
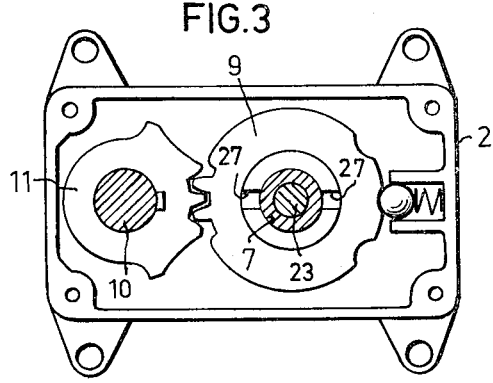
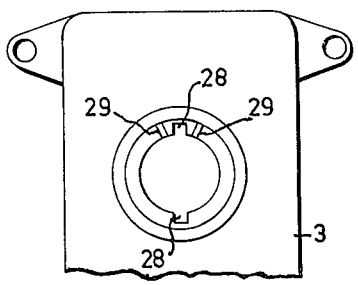
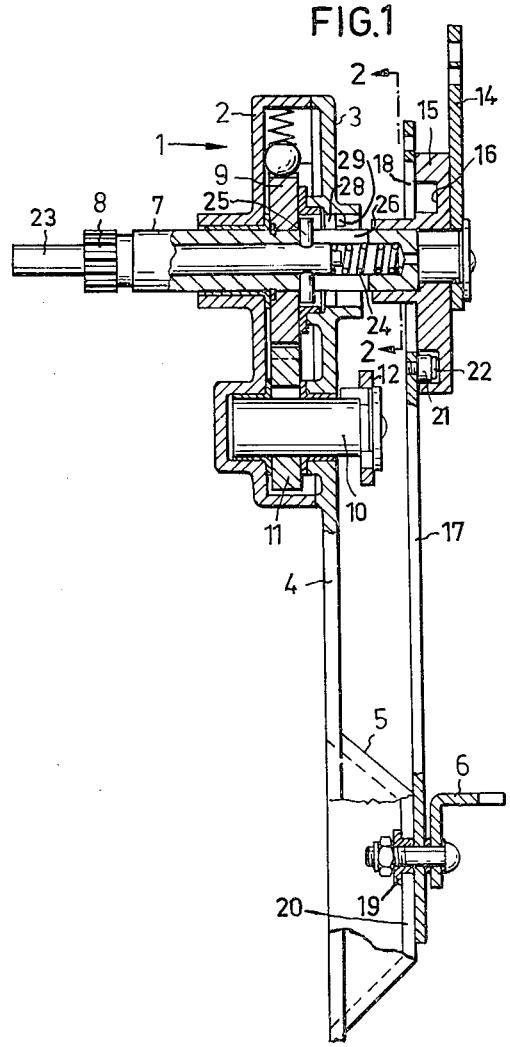

SINGLE LEVER CONTROL DEVICE

The present invention relates to a control device for carrying out two different operations by means of a single operating lever, preferably for control of the throttle and gearing in boat motors, comprising a main shaft rotatably journalled in a housing, on which the control lever acts, a first control arm for the shifting operation which is effected by the rotation of the main shaft by means of a transmission means and a second control arm, connected to the main shaft, for the throttle movement. The transmission means are coupled to the main shaft via a coupling, which has a coupling shaft displaceably disposed in an axial bore in the main shaft, with at least one radially extending driver element, which extends through an axial slot in the main shaft and which element is designed so that in the position of engagement, the coupling shaft being pressed against by spring means, it engages the transmission means. The driver element in the neutral position of the main shaft lies opposite an opening in the housing or in a member connected to the housing, through which opening the driver element at disengagement is designed to be pushed out through axial displacement of the coupling shaft against the effect of the spring means so that in the subsequent rotation of the main shaft it slides against the side of the housing or the member connected to the housing facing away from the motion transmitting means.

Single lever controls with disengagement means are used to make it possible for the throttle to be opened without a gear being engaged at the same time, for example for warming up the motor. Such controls are so designed that the coupling is manually brought into the disengaged positin in connection with the operating lever being moved from the neutral position, whereafter the disengaged position is automatically maintained until the operating lever is again returned to the neutral position, where engagement occurs automatically. In the control described in the introduction the engagement is effected by the driver means, influenced by the spring acting on the coupling shaft which, snaps in through the opening to the coupling position when the main shaft revving"returned to the neutral position.

In controls of this type there is a great risk that a gear will be unintentionally engaged "reviving" the motor, i.e. that the operating lever is unintentionally moved all the way to the neutral position between two consecutive "revvings." There is then an engagement so that when the throttle is then opened the gear is engaged. It is easy to see that this could have serious consequences.

The purpose of the present invention is to achieve a control of the type described in the introduction, in which it is not possible to unintentionally engage a gear after disengagement.

This is achieved according to the invention by providing on the side of the housing or the member connected to the housing at least one stop surface angularly displaced relative to the opening and by arranging the coupling shaft so that when disengaged it is displaced by manual pressure so far that the driver element passes over the stop surface when the main shaft is rotated from the neutral position, whereby, when the manual pressure on the coupling shaft is removed, the stop surface restricts the rotation of the main shaft back to the neutral position. With this arrangement it is impossible to move the driver element back to the opening in the neutral position if the coupling shaft is not again manually displaced so that the driver element can pass over the stop surface. Therefore, the gear cannot be engaged unintentionally.

Since single lever controls are constructed so that there is a delay in the opening of the throttle at the initial rotation of the main shaft from the neutral position, one can still have the idling position of the motor if the stop surface is placed at an angular distance from the opening in the neutral position, corresponding to said delay. In a preferred embodiment of the invention the angle is approximately 25°.

The invention will be described in more detail with reference to the accompanying drawing in which FIG. 1 shows a partial cutaway side-view of a control according to the invention, FIG. 2 a view along the line 2—2 in FIG. 1, and FIG. 3 a view corresponding to FIG. 2 with one housing wall removed.

The control has a housing 1, which consists of two interconnected parts 2 and 3, the latter of which has an extension 4 which forms a console 5 for a displaceable bracket 6 for a control wire casing for a gas wire. In the housing the main shaft 7 is rotatably mounted and is provided on one end with splines 8 for attaching an operating lever not shown. A Geneva-type wheel 9 is attached to the shaft 7 and it engages a Geneva wheel 11 which is non-rotatably attached to a shaft 10.

A first operating arm 12 designed to be connected via a control wire to the gear mechanism of a boat motor is securely attached to the shaft 10. A second operating arm 14 designed to be connected to the control wire for the throttle is securely connected to the main shaft. Axially inside the arm 14 there is a cam disc 15, which is likewise securely connected to the main shaft 7. The cam disc 15 has a cam groove 16. A link 17 is situated axially inside the cam disc 15 and is provided at one end with an oblong opening 18, through which the shaft 7 extends. At its other end the link 17 holds the bracket 6 for the gas control wire sleeve as well as a coupling bush 19, which is displaceable in an oblong opening 20 in the console 5. Furthermore the link 17 carries a cam follower element 21 which engages into the cam groove 16. The cam follower 21 consists of a roller of e.g. delrin which is held onto the link by a screw 22.

By appropriately designing the cam groove 16 an adjusted delay of the opening of the throttle can be obtained until a gear is engaged.

To make possible throttle movement without engaging a gear, e.g. in warming up the motor, the Geneva wheel 9 is disengageable from the main shaft 7. For this reason the shaft 7 has a central bore, through which a coupling shaft 23 displaceably extends. It is kept in the coupling position shown in FIG. 1 by a spring 24 disposed in the bore, in which position a pin 25 in a radial bore in the coupling shaft 7, said pin extending through axial slots 26 in the shaft 7, engages in the cavities 27 (FIG. 3) in the wheel 9 and locks the same for rotation together with the shaft. On each side of the shaft 7 there is in the housing 3 an opening 28 for the ends of the pin 25 extending outside the shaft 7. These openings 28 are placed so that when the shaft is in the neutral position they are right in front of the ends of the pin 25. On the outside of the housing 3 on both sides of one of the openings 28, two stops 29 are disposed, which in the example shown (FIG. 2) are angularly displaced 25° from the centre of the opening 28.

In warming up the motor, since it is desirable to be able to supply gas or "rev" the motor with the gear in the neutral position, the coupling shaft 23 is pressed in against the effect of the spring 24. The pin 25 is then moved out of engagement with the cavities 27 in the wheel 9 and out through the openings 28 so that the wheel 9 is disengaged from the shaft 7. The coupling shaft 23 is pressed in so far that the pin 25 will be situated axially outside the stops 29 and is held at the initial opening of the throttle in this position until one end of the pin has passed one of the stops. Then the coupling shaft 23 can be released so that it is returned somewhat by the spring 24 until the pin comes into contact with the housing surface against which it slides with continued opening of the throttle. The stops 29 restrict the rotation of the shaft 7 back to the neutral position and thereby prevent the pin from being unintentionally brought into engagement with the Geneva wheel 9.

When a gear is to be engaged the coupling shaft 23 is pressed in again in a corresponding manner so that the pin 25 when turned by the shaft 7 to the neutral position passes over the stop 29. The pin is then brought into engagement with the wheel 9 by the spring 24 and locks the wheel to the shaft 7.

What I claim is:

1. Control device for performing two different operations by means of a single operating lever, preferably for control of the throttle and shifting gears in boat motors, comprising a main shaft rotatably journalled in a housing, on which the operating lever acts, a first control arm for the shifting operation which is effected by the rotation of the main shaft by means of a transmission means and a second control arm, connected to the main shaft, for the throttle opening, the transmission means being coupled to the main shaft via a coupling, which has a coupling shaft displaceably disposed in an axial bore in the main shaft, with at least one radially extending driver element, which extends through an axial slot in the main shaft and engages the transmission means in the position of engagement, spring means urging said driver element toward said position of engagement, the driver element in the neutral position of the main shaft lying opposite an opening in the housing or in a member connected to the housing, through which opening the driver element at disengagement is pushed out through axial displacement of the coupling shaft against the effect of the spring means so that upon subsequent rotation of the main shaft the driver element slides against the side of the housing or the member connected to the housing, facing away from the transmission means, there being at least one stationary stop surface angularly displaced relative to and disposed immediately on at least one side of the opening and disposed on the side of the housing or the member connected to the housing and extending in the direction in which the driver element at disengagement is pushed, the coupling shaft being so disposed that when disengaged it is displaced by manual pressure so far that the driver element passes over the stop surface when the main shaft is rotated from the neutral position, and when the pressure on the coupling shaft is released and the main shaft rotated back toward the neutral position, the driver element engages the stop surface and prevents the rotation of the main shaft back to the neutral position until the driver element is again pushed and rotated to clear the stop surface.

2. Control according to claim 1, characterized in that the driver member is formed by a pin, which extends through a radial bore in the coupling shaft.

3. Control according to claim 1, characterized in that a stop surface is disposed on each side of the opening.

4. Control according to claim 1, characterized in that the stop surface is angularly displaced about 25° from the centre of the opening.

* * * * *